(12) United States Patent
Cloonan et al.

(10) Patent No.: US 6,637,033 B1
(45) Date of Patent: Oct. 21, 2003

(54) SIGNAL SPLITTER AND GAIN ADJUSTMENT SYSTEM FOR A CABLE DATA SYSTEM

(75) Inventors: Thomas J. Cloonan, Lisle, IL (US); Gerald P. Ryan, Lake Zurich, IL (US); Ubaldo Cepeda, Algonquin, IL (US)

(73) Assignee: Arris International, Inc., Duluth, GA (US)

( * ) Notice: Subject to any disclaimer, the term of this patent is extended or adjusted under 35 U.S.C. 154(b) by 655 days.

(21) Appl. No.: 09/613,415

(22) Filed: Jul. 10, 2000

(51) Int. Cl.[7] .......................... H04N 7/173; H04N 7/16
(52) U.S. Cl. ................... 725/117; 725/116; 725/119; 725/121; 725/124; 725/127; 725/149
(58) Field of Search ................... 725/114, 116–121, 725/124, 125, 127, 149, 147; 348/678, 707; 455/116, 126, 127; 379/390.01, 390.03, 395, 404; 330/124 R, 51, 136, 254, 255, 278, 284

(56) References Cited

U.S. PATENT DOCUMENTS 5,109,286 A * 4/1992 West et al. ................ 725/127
5,745,846 A * 4/1998 Myer et al. ................ 455/209
6,091,441 A * 7/2000 Al-Araji et al. ........... 455/3.02
6,567,987 B1 * 5/2003 Farhan et al. .............. 725/125

OTHER PUBLICATIONS

U.S. Pat. App. Pub. US 2003/0066088 A1, Apr. 2003, Jung et al.*

U.S. Pat. App. Pub. US 2002/0116720 A1, Aug. 2002, Terry et al.*

* cited by examiner

Primary Examiner—John Miller
Assistant Examiner—Brian Cornwell

(57) ABSTRACT

In a cable data system, frequency division multiplexed upstream data traffic is first split for subsequent signal processing. In the course of performing an analog RF signal splitting operation, signal splitter output amplitude is decreased as an artifact of an RF signal splitter. A signal splitter indicator type that is used per signal splitter, provides an indication to the CMTS channel interface cards to control the amount of compensating gain required to restore the original signal to its original amplitude.

8 Claims, 1 Drawing Sheet

SIGNAL SPLITTER AND GAIN ADJUSTMENT SYSTEM FOR A CABLE DATA SYSTEM

FIELD OF THE INVENTION

This invention relates to a cable data system by which two-way data communications, such as Internet access, is provided via a cable televisions system. In particular, this invention relates to an improved method and apparatus for connecting the physical cable media to a cable modem termination system (CMTS) so as to expedite installation and provide a more serviceable CMTS to maintenance personnel.

BACKGROUND OF THE INVENTION

Cable television systems are well known. In such a system, several different frequency-division multiplexed television channels are distributed to subscribers over a coaxial cable. Each television channel is typically allocated a frequency band, (typically 6 MHz.) in which audio and video information for a television channel is carried. Data signals can also be modulated onto an RF carrier and be transmitted in one or more of the pre-allocated television frequency bands. By allocating one or more T.V. channels for data, the cable television network can readily carry data, such as the data exchanged between computers. Cable data systems provide Internet access to subscribers at speeds that are far greater than dial-up modems.

A cable communications system topology resembles an inverted tree or a directed acyclical graph. The top or upper-most node in a directed acyclical graph (DAG) representing a cable distribution system is the node from which signal information is distributed and is frequently referred to as the cable system head end. Each link in the DAG represents a coaxial cable on which there might be several different frequency-division multiplexed signals.

One or more cable modem termination systems (CMTS) at or near the head end direct the distribution and collection of data to, and from, cable data system subscribers. At the head end of a cable data system, there are typically hundreds of physical cables that branch out from the head end to and from the system subscribers' homes over a hybrid-fiber coaxial system. Downstream signals are transported on a hybrid-fiber coaxial cable with carrier frequencies centered above the 50 MHz point in the cable spectrum, while upstream signals are transported on a hybrid-fiber coaxial cable with carrier frequencies centered in the 5–42 MHz region of the cable spectrum.

Several different upstream channels can be frequency division multiplexed onto a single cable. In order to recover each channel, the upstream signal must be divided (or split) so that it can be coupled into separate RF band pass filters before being terminated at a unique Physical Interface (PHY) chip. Each PHY chip filters and demodulates the upstream signal for a particular channel to re-create the digital data stream for that channel.

If each upstream channel is transported on a different upstream cable, then a different cable must be used to inject each upstream channel into a unique CMTS upstream connector. In the high-capacity, high-bandwidth CMTS systems of the future, there will be many upstream channels supported by a single CMTS, so this will result in a large number of cables connecting to the CMTS in a relatively small area (yielding very high cable densities). These high cable densities can be difficult to manage.

However, if several upstream channels are frequency-division multiplexed on a single upstream cable, then it is possible to reduce the high cable densities at the CMTS by injecting multiples of these upstream channels over a single cable into a single CMTS upstream connector. For example, if four upstream channels are always frequency-division multiplexed on every upstream cable, then a system that originally required 100 separate upstream cables could be re-cabled using only 25 upstream cables, where each of the upstream cables carries four upstream channels into the CMTS. However, in order to permit this desirable decrease in cable density, the CMTS must be able to provide the further splitting required to route each of the upstream channels to a unique CMTS RF band pass filter and PHY chip. Since the actual number of upstream channels that will be multiplexed together is oftentimes unknown until the cable system is being assembled, the amount of integrated splitting provided by the CMTS must be configurable by the installer. This can be accomplished by providing several circuit cards with different splitting ratios so that the CMTS equipage can be fine-tuned to match the needs of the installer.

Although this solution solves the cable density problem, it leads to another problem, because installation of circuit cards with different splitting ratios will lead to different amounts of loss in the upstream signal paths. To maintain acceptable signal levels at the PHY chips, the CMTS should probably provide suitable gain to compensate for the splitting loss. Unfortunately, the required gain cannot be predicted until the installer has inserted the actual splitter circuit card (with a particular splitting ratio pre-defined on the circuit card). Thus, it would be beneficial if the CMTS could sense the splitting ratio on the installed splitter circuit card and provide adequate gain to directly compensate for the resulting splitter loss.

SUMMARY OF THE INVENTION

In a cable data system, upstream frequency-division multiplexed signals that received at a CMTS on a single cable are divided (i.e. split) using an analog radio frequency (RF) splitter so that individual frequency bands can be selectively filtered by CMTS channel interface cards that include band pass filters, which in at least one embodiment are programmably tuned to the center frequency of a particular pass band.

The CMTS signal splitter card is inserted into a card edge connector, preferably at the rear of the CMTS and includes on the card, one or more resistive networks which, by way of card edge connector wiring and splitter card wiring, automatically identifies to the CMTS and the channel interface cards (which filter and amplify signals in predetermined frequency bands) the signal splitting ratio of the signal splitter card.

A known artifact of splitting an RF cable signal, using an analog signal splitter, is a corresponding reduction in the split signal amplitude that is proportional to the signal division factor. By way of example, splitting an RF signal into two (2) separate signals causes each of the two, separate output signals from the splitter to be 3 dB (decibels) below the level of the signal input to the splitter. Splitting a signal into four (4) signals causes each one of the four separate outputs to be 6 dB below the signal level input to the splitter. Splitting a signal into eight (8) signals causes each one of the eight separate outputs to be 9 dB below the signal level input to the splitter.

In the preferred embodiment, the CMTS channel interface cards recognize the division ratio of the signal splitter card in the CMTS back plane and automatically increase the gain of programmable gain compensation stage (i.e. an amplifier) which is preferably an amplifier that is either band-pass tunable, or having a wide enough frequency response to amplify the entire spectrum of signals that it will be expected to amplify, so as to restore the signal amplitude output from the splitter to the amplitude that was input to the splitter. Different signal splitter cards with different signal division factors use different resistive indicator networks to identify to the CMTS and the channel interface cards, the amount of amplification required to compensate for the signal splitting. Increased system reliability is achieved by automatically adjusting RF signal amplification after splitting a frequency-division multiplexed signal into its respective components for subsequent recovery of data signals from subscribers.

DETAILED DESCRIPTION OF THE PREFERRED EMBODIMENT

Figure 1:
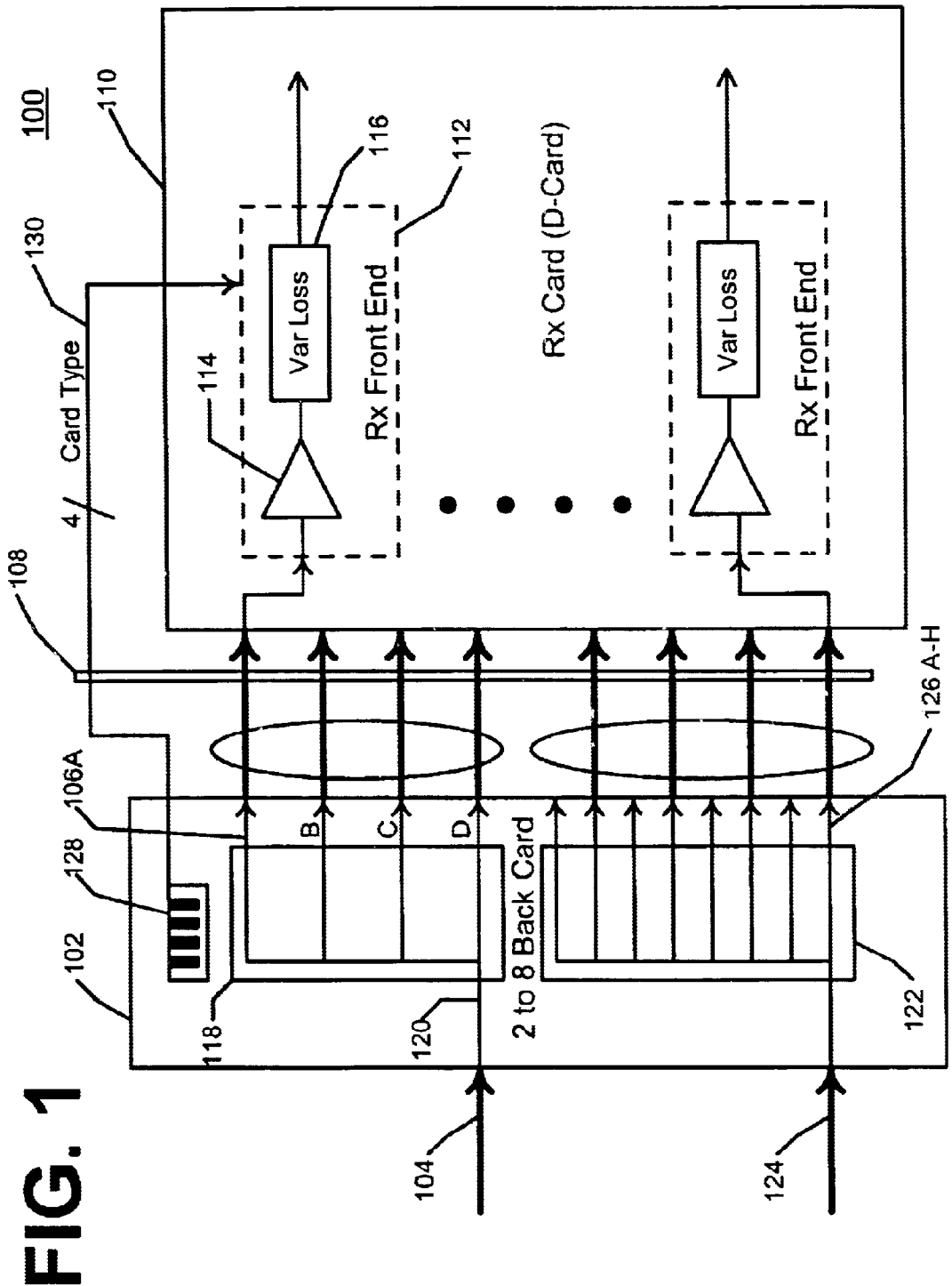
FIG. 1 shows a simplified drawing of a system for splitting cable data signals and automatically amplifying the split signals to compensate for the signal splitting division ratio.

FIG. 1 shows a simplified representation of a system of a signal splitter with automatic gain amplification compensation for use with a cable modem termination system (CMTS). The system 100 includes an integrated signal splitter card 102 for use with an upstream cable data system wherein frequency division multiplexed signals are received at a first RF input port or terminal 104 on the integrated splitter card 102 such that the frequency division multiplexed signals input at input terminal 104 are divided and appear at multiple output terminals or ports 106a-d on the signal splitter card 102 for connection to a mid-plane connector 108 for the CMTS. The mid-plane is analogous to a back plane that supports card edge connectors, however, the mid-plane 108 has connectors on both sides (not shown for clarity) such that circuit cards can be inserted into the CMTS from both the front and rear sides, into connectors of the mid-plane 108.

The outputs at the terminals 106a-d from the signal splitter card 102 are routed through the mid-plane 108 connector to a CMTS channel interface card 110. In the preferred embodiment, each channel interface card 110 includes an RF front end 112 comprised of a frequency selective filter 114 and a variable gain stage 116. The frequency selective filter 114 is preferably a passband filter that selectively passes only the frequency of a cable data channel of interest, and on which data is carried, to a programmable gain stage 116 that is responsive to signals received from the integrated splitter card 102. Typical embodiments for the passband filter (not shown) include active or passive filters as well as suitably fast digital signal processors.

Input signals on the upstream cable 104, which are frequency division multiplexed, are coupled into an analog signal splitter 118 having an input 120 and outputs 106a-d as shown. The analog splitter 118 functions as any radio frequency analog signal splitter functions and it produces at each of the output terminals 106a-d a copy of the signal input at terminal 104.

It is well known that an artifact of a signal splitter is a reduction in the signal amplitude output at each terminal 106a-d of the splitter 118. In the case of a 1:4 splitter, i.e. a splitter with a single input and four separate outputs, the process of splitting the signals into four different outputs produces a single loss of 6dB. Stated alternatively, the amplitude of the outputs at the terminals 106a-d will be six dB below the amplitude input at terminal 104.

As shown in FIG. 1, the integrated splitter card 102 also includes a 1:8 splitter 122, which is preferably an RF signal splitter suitable for use with cable data-frequency signals, i.e. capable of splitting RF signals up to approximately 800 MHz. or higher. Signals input at input terminal 124 and which are output at terminals 126a-g will be reduced in amplitude by an amount equal to 10dB.

In a cable data system, the prior art solution to processing the different frequency channels was to incorporate a discreet signal splitter on an upstream cable followed by discreet amplification/gain stages. In FIG. 1, the integrated signal splitting card 102 is equipped with a card type indicator 128, which in the preferred embodiment is a pad of resistors between ground potential and coupled to a multi-wired bus 130 through the mid-plane connector 108 to the channel processing card 110. Alternate embodiments of the card type indicator would include so-called DIP switches, selectable jumpers or even hardwired jumpers by which a signal or combination of voltages, resistances or other measurable electrical signal is generated to identify the signal splitting performed in the signal splitter card. By means of the signals provided by the card type indicator 128, the CMTS as well as the CMTS channel interface card 110 can automatically know the type of signal splitter card being used to couple the upstream data channels to the CMTS.

As shown in FIG. 1, the signal splitter card 102 uses a 1:4 signal splitter 118 the outputs of which appear at terminals 106a-d. For purposes of a 1:4 signal splitter ratio, each gain stage of the receiver front end 116 is required to boost the signal level from the splitter by a factor of 6 dB. By reading the card type through the connections provided at the card type indicator 128, which are coupled through the mid-plane 108 and wired directly to the channel interface card front ends 112, the channel interface cards can automatically apply an appropriate gain factor to restore the original amplitude of the signal input at terminal 104 to the integrated splitter card.

In the preferred embodiment, connections between the card type indicator 128, which path through the mid-plane directly to the channel interface card 110 are decoded by the channel interface cards automatically to hard wiring. No processor overhead is required because the circuitry on both the integrated splitter card and the channel interface card are designed to automatically adjust the amplification provided according to the signals provided by the channel indicator 128.

By providing an automatic gain increase 116 according to the splitter card type, the proper amount of signal amplification is automatically provided to the upstream cable data channel signals after they are divided into separate, but reduced amplitude copies, by the signal splitter 118 and selectively filtered by the channel interface card programmable filters 114. In operation, after the particular passband signals are selectively filtered to isolate the upstream data, that data can be amplified by an amount equal to the signal loss attributable to the splitting operation performed in the integrated splitter card circuit.

In the preferred embodiment, the integrated signal splitter card 102 employs similar division ratio splitters. Depending upon the splitting factor used on a particular card, the gain compensation by the channel interface card 110 might have to be adjusted upwardly or downwardly. An appropriate high-frequency operational amplifier is one example of a gain stage embodiment. Those skilled in the art will recognize that by selecting differently-valued feedback, the gain of such a device can be adjusted as needed. Differently-valued feedback resistors can be selected under program control by opening and closing relays so as switch in and switch out, more or less negative feedback to control gain. The selection of an amplification factor is preferably done by the card type indicator 128 signals. In an alternate embodiment, a processor (not shown) can select the gain factor and is considered herein to be an equivalent embodiment and providing the programmable gain. In at least one alternate embodiment, the programmable gain stage also provide frequency-selective gain, such that only the signals in a particular frequency band or spectrum are amplified. An active filter providing a positive gain would achieve such a result.

In the case of a 1:4 splitter, each channel interface card front end processor (including the programmable gain stage) should restore 6dB of gain to the frequency divided signals. In the case of a 1:8 splitter, the gain that must be restored by the channel interface card is higher, well known to those in the art to be approximately 10dB.

In the preferred embodiment, in the cable modem termination system of Cadant, Inc., the channel interface cards are plugged into the front side of the CMTS card cage. These channel interface cards 110 are inserted to a so-called mid-plane edge connector and receive the contacts on the edge connector of the channel interface cards 110. The mid-plane 108 has coupled to its opposite side, another card edge connector into which the integrated signal splitter card is coupled. In this fashion, the myriad of cables coming up from a cable data system, can be wired into a so-called "back card" that is the integrated signal splitter card thereby keeping the maze of wires and cables coming up from a cable data system out of sight from the front side of the cable modem termination system.

By automatically sensing the type of integrated splitter card used, cable data systems that multiplex 4 signals onto a cable or 8 signals onto a cable or 2 signals onto a cable can have the channel interface card 110 automatically provide the appropriate amount of gain compensation, without relying upon external circuitry separate and apart from the CMTS hardware.

Assembling the components for a cable data system is simplified by using an integrated signal splitter card which together with the wiring provided by the mid-plane and channel interface cards provide a system by which cable signal splitting and gain compensation is automatically provided. System maintainability is improved because craft persons do not have to track the type of gain required to compensate for various signal splitting ratios used in the prior art.

We claim:

1. Apparatus for automatically compensating for signal strength loss caused by RF signal splitting in a cable data communications system, said system comprised of:
   a. an RF signal splitter having a first RF signal input port and further having N, RF signal output ports, said RF signal splitter attenuating an RF input signal whereby reduced-amplitude copies of an RF input signal are passed at each of said N output ports;
   b. a splitting ratio indicator circuit coupled to said RF signal splitter card and identifying the RF signal splitting signal ratio 1/N, of said RF signal splitter card;
   c. at least one, programmable gain compensation stage having a first RF signal input coupled to a predetermined one of said N, RF signal output ports, a signal amplification control input port coupled to said splitting ratio indicator circuit output terminal and having an RF signal output port;
   whereby signals from a cable data communication system are automatically level compensated by said programmable gain compensation stage by an amount established by the signal splitting ratio as identified by said splitting ratio indicator circuit.

2. The apparatus of claim 1 wherein said programmable gain compensation stage is a programmable gain stage providing predetermined radio frequency signal amplification.

3. The apparatus of claim 1 wherein said at least one, programmable gain compensation stage provides a predetermined signal gain determined by, and substantially equal to the attenuation attributable to said RF signal splitter.

4. The apparatus of claim 1 wherein said at least one, programmable gain compensation stage includes a frequency selection input control port to control the frequency of signals that are amplified by said programmable gain compensation stage.

5. Apparatus for automatically compensating for signal strength loss caused by RF signal splitting in a cable data communications system, said system comprised of:
   a. an RF signal splitter card having a first RF signal input port and further having N, RF signal output ports, said RF signal splitter card coupled to and receiving upstream frequency division multiplexed signals from a cable data communications system, said RF signal splitter card further comprised of:
      i. a splitting ratio indicator circuit coupled to said RF signal splitter card and identifying to a cable modem termination system (CMTS) interface circuit via at least one output terminal, the signal splitting signal ratio 1/N, of said RF signal splitter card;
   b. at least one, programmable gain compensation stage having a first RF signal input coupled to a predetermined one of said N, RF signal output ports and having signal amplification control input port coupled to said splitting ratio indicator circuit output terminal;
   whereby upstream frequency division multiplexed signals from a cable data communication system are automatically level compensated by said programmable gain compensation stage by an amount established by the signal splitting ratio as identified by said splitting ratio indicator circuit.

6. The apparatus of claim 5 wherein said programmable gain compensation stage is a frequency-agile, programmable gain stage providing predetermined radio frequency signal amplification amounts.

7. The apparatus of claim 5 wherein said at least one, programmnable gain compensation stage provides a predetermined signal gain determined by, and substantially equal to the attenuation attributable to said RF signal splitter.

8. The apparatus of claim 5 wherein said at least one, programmable gain compensation stage includes a frequency selection input control port to control the frequency of signals that are amplified by said programmable amplifier.

* * * * *